US009737182B2

(12) United States Patent
Gindele et al.

(10) Patent No.: US 9,737,182 B2
(45) Date of Patent: Aug. 22, 2017

(54) HANDHELD WORK APPARATUS HAVING A BLOWER TUBE (71) Applicant: Andreas Stihl AG & Co. KG, Waiblingen (DE)

(72) Inventors: Cornelius Gindele, Plochingen (DE); Heiko Rosskamp, Adelberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 441 days.

(21) Appl. No.: 14/552,340

(22) Filed: Nov. 24, 2014

(65) Prior Publication Data
US 2015/0143657 A1 May 28, 2015

(30) Foreign Application Priority Data

Nov. 22, 2013 (EP) .................................... 13005473

(51) Int. Cl.
*A47L 5/14* (2006.01)
*A01G 1/12* (2006.01)
*A47L 5/24* (2006.01)
*A47L 9/32* (2006.01)

(52) U.S. Cl.
CPC ............... *A47L 5/14* (2013.01); *A01G 1/125* (2013.01); *A47L 5/24* (2013.01); *A47L 9/322* (2013.01)

(58) Field of Classification Search
CPC ... A47L 5/14; A47L 5/24; A47L 9/322; A01G 1/125
See application file for complete search history.

(56) References Cited

U.S. PATENT DOCUMENTS

| 4,734,017 A | 3/1988 | Levin |
| 4,945,604 A | 8/1990 | Miner et al. |
| 6,105,206 A | 8/2000 | Tokumaru et al. |
| 6,336,244 B1 * | 1/2002 | Tarutani et al. .......... A47L 5/14 15/326 |
| 2014/0140861 A1 | 5/2014 | Pellenc |

FOREIGN PATENT DOCUMENTS

WO 2009/144257 A2 12/2009

* cited by examiner

*Primary Examiner* — Laura C Guidotti
(74) *Attorney, Agent, or Firm* — Walter Ottesen, P.A.

(57) ABSTRACT

A handheld work apparatus has a blower tube with a blower arranged therein. The blower conveys a working air flow through the blower tube and has an impeller rotatably driven by an electric drive motor. A diffuser is mounted in a stationary manner in the blower tube downstream of the impeller. The motor is arranged in a motor compartment in the blower tube. Downstream of the diffuser, the work apparatus has an extraction opening for cooling air for the drive motor, via which an annular space, formed between the blower tube and the motor compartment, is connected to the motor compartment. The motor compartment has an outflow opening for cooling air arranged upstream of the extraction opening. The extraction opening and the outflow opening are arranged so that during operation the pressure at the extraction opening is greater than the pressure at the outflow opening.

19 Claims, 9 Drawing Sheets

HANDHELD WORK APPARATUS HAVING A BLOWER TUBE

CROSS REFERENCE TO RELATED APPLICATION

This application claims priority of European patent application no. 13005473.7, filed Nov. 22, 2013, the entire content of which is incorporated herein by reference.

BACKGROUND OF THE INVENTION

A handheld, electric motor-driven blowing apparatus, in which the drive motor and the control unit of the drive motor are arranged in an inner tube which is arranged centrally in the blowing air flow, is known from U.S. Pat. No. 6,105,206. The cooling air for cooling the drive motor flows upstream of the impeller of the blowing apparatus into the annular space in which flows the working air flow. The drive motor is arranged upstream of the diffuser of the blower of the blowing apparatus with regard to the flow direction in the blower tube. In the case of the arrangement shown in U.S. Pat. No. 6,105,206, there is a very long overall length of the blowing apparatus.

WO 2009/144257 A2 shows a leaf vacuum with a drive motor which drives an impeller. The drive motor is arranged downstream of the impeller with regard to the flow direction of the working air flow. Cooling air for cooling the drive motor can be drawn in via a support rib of hollow design which penetrates the annular space and forms a feed passage for cooling air. The feed passage adjoins a cooling air opening of the housing.

SUMMARY OF THE INVENTION

It is an object of the invention to provide a handheld work apparatus which is simply constructed and enables a compact construction.

The handheld work apparatus of the invention includes: an electric drive motor; a blower tube; a blower arranged in the blower tube and configured to convey a working air flow through the blower tube in a flow direction; the blower including at least one impeller configured to be rotatably driven about a rotational axis by the drive motor and at least one diffuser fixedly held at a location in the blower tube; the diffuser being arranged downstream of the impeller with respect to the flow direction; the blower tube further having a motor compartment arranged therein; the electric drive motor being arranged in the motor compartment; the blower tube and the motor compartment conjointly defining an annular space therebetween configured to permit the working air flow to flow therethrough; the work apparatus defining an extraction opening for cooling air for the electric drive motor; the extraction opening being arranged downstream of the diffuser; the motor compartment having at least one outflow opening for cooling air arranged upstream of the extraction opening with respect to the flow direction in the blower tube; the annular space being connected to the motor compartment via the extraction opening; the extraction opening and the outflow opening being arranged such that during operation of the work apparatus a first pressure ($p_5$) at the extraction opening is greater than a second pressure ($p_2$, $p_a$) at the outflow opening.

It is provided that the extraction opening for cooling air for the drive motor is arranged downstream of the diffuser or guide wheel. The motor compartment, in which is arranged the drive motor, has at least one outflow opening for cooling air which is arranged upstream of the extraction opening with regard to the flow direction of the working air flow in the blower tube. The extraction opening and the outflow opening are arranged in this case so that during operation the pressure at the extraction opening is greater than the pressure at the outflow opening. Due to the fact that the extraction opening for cooling air is arranged downstream of the diffuser, cooling air under positive pressure can be extracted from the working air flow through the motor compartment. This positive pressure can be used in order to effect the cooling air flow through the motor compartment. As a result, an additional fan wheel for the feed of cooling air is not absolutely necessary. Consequently, a simple, compact construction is made possible. The drive motor can be arranged in the region of the impeller or of the diffuser, for example, and does not have to be positioned upstream of the impeller.

The pressure in the motor compartment during operation, with regard to the flow direction of the working air flow through the blower tube downstream of the drive motor, is greater than the pressure at the outflow opening so that the cooling air in the motor compartment at the drive motor flows in the opposite direction to the working air flow. Via a suitable structural configuration, the pressure drop through the motor compartment can be set so that adequate cooling of the drive motor during operation is ensured. The pressure ratios are largely predetermined based on the geometric dimensions so that a corresponding match is easily possible. The motor compartment, with the exception of the extraction opening and the outflow opening, is generally advantageously of a closed design. Consequently, an effective cooling can be achieved and ensured. The outflow opening advantageously opens into a region in which during operation prevails a pressure which at most is as high as the pressure in the annular space directly upstream of the diffuser. The outflow opening can in this case open into the annular space itself upstream of the diffuser. Consequently, a simple construction is created. A gap which forms the outflow opening is advantageously formed between impeller and diffuser. A seal between impeller and diffuser can be omitted as a result. A simple construction is created. It can also be advantageous, however, that the outflow opening opens into the environment. A mouth of the outflow opening upstream of the impeller into the annular space can also be advantageous.

Advantageously arranged downstream of the blower is an outlet guide element, the outside diameter of which reduces in the annular space in the flow direction. On account of the reduction of the diameter of the outlet guide element, with a constant diameter of the blower tube the free flow cross section increases in the flow direction and the pressure increases. The extraction opening is advantageously arranged on a downstream-disposed end face of the outlet guide element with regard to the flow direction in the annular space. In this region, a comparatively higher pressure ensues during operation so that an adequate cooling air flow for the drive motor can already be achieved solely on account of the pressure drop between extraction opening and outflow opening. The arrangement on an end face of the outlet guide element brings about a sharp deflection of the cooling air which enters the motor compartment through the extraction opening. This leads to larger particles not being able to find their way into the extraction opening on account of their inertia. As a result, contamination of the drive motor is avoided. The extraction opening is arranged downstream of the impeller. The impeller during operation, on account of its rotation, projects dirt particles outward with regard to the rotational axis of the impeller. As a result, the air in the center region of the air flow is comparatively clean and low in dirt particles. The outlet guide element is preferably arranged centrally in the air flow. As a result of the arrangement of the extraction opening on the outlet guide element the air is extracted from the region of the air flow which conducts comparatively clean air.

In order to comparatively minimize the flow resistance at the inlet into the extraction opening, it is provided that the outlet guide element, adjacent to the extraction opening, is of a rounded configuration in a sectional plane which includes the rotational axis of the impeller.

The drive motor, on its outer circumference, is advantageously completely encompassed by an inner cylindrical wall of the diffuser. As a result, the blower can also be used in a dirt-laden environment such as in the case of a blowing apparatus or a vacuum apparatus, for example. Due to the fact that the inner wall of the diffuser itself is configured as a closed housing wall which delimits the motor compartment, additional components for delimiting the motor compartment in this region are avoided. A discharge nozzle, through which the blower delivers the working air flow, is advantageously fastened on the blower tube. For supplying the drive motor with electric energy and for controlling thereof, the drive motor advantageously has at least one connecting cable. Provision is advantageously made for a cable conduit which connects the motor compartment to a housing interior arranged outside the blower tube and through which projects at least one connecting cable of the drive motor. In order to achieve a largely closed motor compartment and to avoid the possibility of cooling air escaping through the cable conduit, it is provided that the free flow cross section of the cable conduit is as small as possible.

In a particularly advantageous embodiment, it is provided that the cable conduit extends at least partially in a guide vane of a diffuser. The air flow is consequently not impaired, or only slightly impaired, by the cable conduit. The guide vane in this case is advantageously formed partially on the diffuser and partially on the outlet guide element. The cable conduit is advantageously of split design in its longitudinal direction. As a result, the production of the cable conduit, for example by injection molding, is simplified. As a result of the longitudinal split of the cable conduit, the installation of the connecting cable is also simplified. The connecting cables can be laid in one of the shell sections of the cable conduit and the cable conduit can then be closed off by the other shell section. This is especially advantageous in the case of a very small, free flow cross section of the cable conduit. A time-consuming threading of the connecting cable through the cable conduit can be dispensed with. The free flow cross section of the cable conduit is advantageously less than approximately 10%, preferably less than approximately 5%, of the flow cross section of the extraction opening. In particular, the cable conduit tightly encloses the connecting cable(s) of the drive motor and is formed approximately with sealing effect. It can also be advantageous to seal the cable conduit so that no cooling air can flow through the cable conduit.

For controlling the drive motor, provision is advantageously made for a control unit, which is arranged in the housing interior of the work apparatus, for the drive motor. For cooling the control unit, a separate cooling air flow can be provided. To this end, it is advantageously provided that a first cooling air opening leads into the housing interior, and that the housing interior is connected via a second cooling air opening to a region upstream of the blower. The control unit is advantageously arranged in the flow path between the first cooling air opening and the second cooling air opening. As a result, active cooling of the control unit is achieved on account of the negative pressure which prevails in the blower tube upstream of the blower.

A simple construction is achieved if the drive motor is an internal-rotor motor. The motor can consequently be fixed in relation to the housing of the work apparatus in a simple manner, for example by fixing in the diffuser. The work apparatus advantageously has a handle which serves for guiding the working air flow during operation. The work apparatus is especially a blowing apparatus or a vacuum/blowing apparatus.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
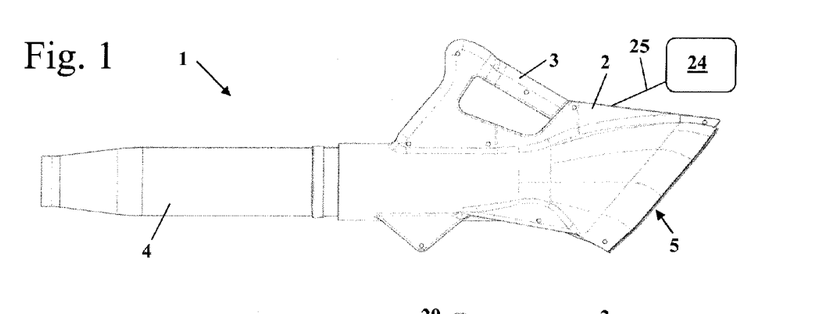
FIG. 1 is a partially schematic side view of a blowing apparatus.

FIG. 1 shows a blowing apparatus 1 as an embodiment for a handheld work apparatus with a blower tube. The blowing apparatus 1 has a housing 2 on which is fastened a handle 3 for guiding the working air flow of the blowing apparatus 1 during operation and for carrying the blowing apparatus 1. The blowing apparatus 1 has a discharge nozzle 4 through which flows the working air flow. Different discharge nozzles 4 can be fastened on the blowing apparatus 1 in order to alter the shape of the air flow being blown out. A suction opening 5 serves for the drawing in of working air.

The blowing apparatus 1 has a drive motor, not shown in FIG. 1, which is connected via a connecting cable 25 to a battery 24 which is shown schematically in FIG. 1. The battery 24 can advantageously be carried by operator on the back in the manner of a backpack. Integration of the battery 24 into the housing 2 of the blowing apparatus 1 can also be advantageous, however. The battery 24 is advantageously connected to the drive motor via a control unit, which is not shown in FIG. 1.

Figure 2:
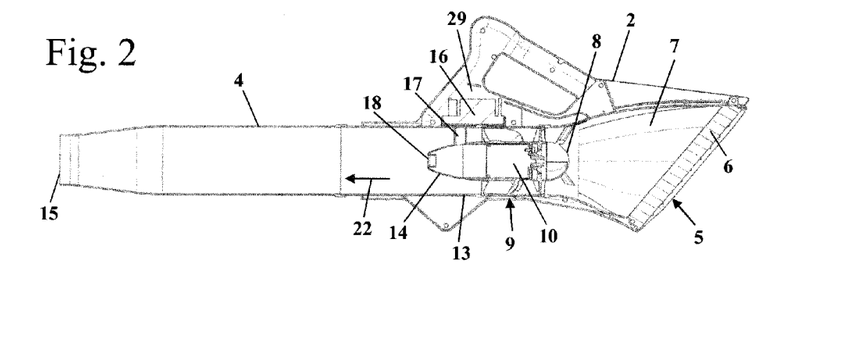
FIG. 2 shows a section through the blowing apparatus from FIG. 1.

As FIG. 2 shows, the housing 2 has a blower tube 13 in which is arranged a blower 9. The blower 9 includes a drive motor 10 which is supplied with energy from the battery 24 (FIG. 1). The drive motor 10 is connected to a control unit 16 via connecting cables, not shown in FIG. 2, which are guided through a cable conduit 17. The control unit 16 is arranged in a housing interior 29 which is formed outside the blower tube 13. During operation, the blower 9 feeds working air in a flow direction 22 through the blower tube 13 and the discharge nozzle 4. The working air leaves the blowing apparatus 1 at a discharge opening 15 which is formed on the discharge nozzle 4. The working air is drawn in by the blower 9 via a suction opening 5 into an inlet duct 7 and from there is drawn into the blower tube 13. An inlet grill 6 is arranged at the suction opening 5 and retains larger contaminants such as leaves or the like. As FIG. 2 also shows, the blower 9 has an inlet guide element 8 of approximately semispherical configuration which is arranged in the region of the inlet into the blower tube 13. On the downstream-disposed side with regard to the flow direction 22, the blower 9 has an outlet guide element 14 which is formed as a cone with an outer surface which extends in a curved manner, for example parabolically, in the flow direction 22. The outlet guide element 14 can also have a different outer contour. The outlet guide element 14 is preferably configured in the shape of a truncated cone with an outer surface extending rectilinearly in the flow direction. The outlet guide element 14, up to the cable conduit 17, is of rotationally symmetrical configuration. The outside diameter of the outlet guide element 14 reduces in this case in the flow direction 22. On the downstream-disposed end face with regard to the flow direction 22, an extraction opening 18 for cooling air for the drive motor 10 is formed on the outlet guide element 14.

Figure 3:
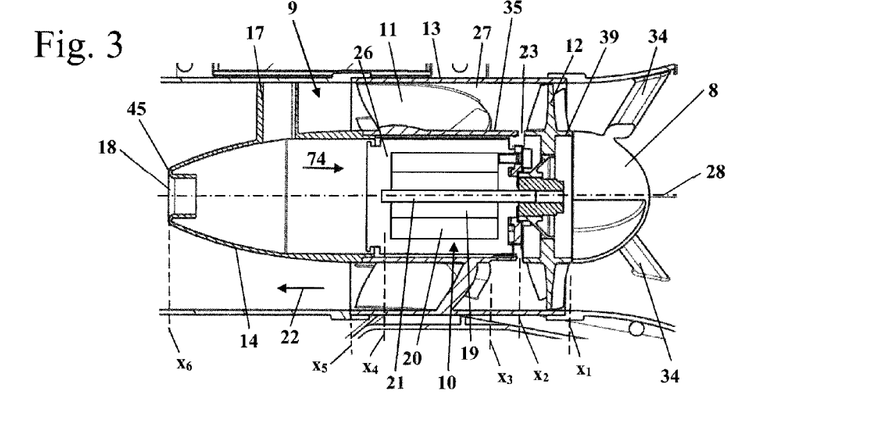
FIG. 3 shows the region of the blower of the blowing apparatus from FIG. 1 in enlarged view.

FIG. 3 shows the construction of the blower 9 in detail. As FIG. 3 shows, the inlet guide element 8 has support ribs 34 via which the guide element 8 is supported on the housing 2 of the blowing apparatus 1. In the embodiment, altogether three ribs 34 are provided. A different number of support ribs 34 can also be advantageous. The inlet guide element 8 is supported in the housing 2 in a stationary manner. Arranged downstream of the inlet guide element 8 is an impeller 12 which is rotatably driven around a rotational axis 28 by the drive motor 10. The drive motor 10 is configured as an electric motor, specifically as an internal-rotor motor, in the embodiment. Downstream of the impeller 12, a diffuser 11 is arranged in the blower tube 13. The impeller 12 has a cylindrical inner wall 39, the outside diameter of which corresponds to the outside diameter of the adjacent region of the inlet guide element 8. The diffuser 11, which is arranged downstream of the impeller 12, has a cylindrical inner wall 35, the outside diameter of which corresponds to the outside diameter of the inner wall 39 of the impeller 12. The inner wall 35 of the diffuser 11 delimits a motor compartment 26, in which is arranged the drive motor 10. Formed between the inner wall 35 and the blower tube 13 is an annular space 27 through which flows the working air flow in the flow direction 22. The vanes of the impeller 12 and the guide vanes of the diffuser 11 are arranged in the annular space 27.

The drive motor 10 shown schematically in FIG. 3 has a radially outer stator 20 which is fixedly mounted on the diffuser 11. The drive motor 10 has a rotor 19 which is connected in a rotation-resistant manner to the drive shaft 21 and rotatably drives the drive shaft 21 around the rotational axis 28. The impeller 12 is fastened on the drive shaft 21.

An annular gap is formed between the inner wall 35 of the diffuser 11 and the inner wall 39 of the impeller 12 and forms an outflow opening 23 for cooling air. To this end, impeller 12 and diffuser 11 in the embodiment have a distance from each other in the direction of the rotational axis 28.

The outlet guide element 14 is arranged downstream of the diffuser 11. The outside diameter of the outlet guide element 14, on the side facing the diffuser 11 and disposed downstream with regard to the flow direction 22, has an outside diameter which corresponds to the outside diameter of the inner wall 35. The cable conduit 17 is formed on the outlet guide element 14 and is also arranged downstream of the diffuser 11. The cable conduit 17 is formed as a separate support on the outlet guide element 14 projecting outward approximately radially to the rotational axis 28 of the impeller 12. As FIG. 3 also shows, the outlet guide element 14 is provided with a rounding 45 adjacent to the extraction opening 18 in the sectional plane, shown in FIG. 3, which includes the rotational axis 28. The rounding 45 is advantageously formed rotationally symmetrically around the rotational axis 28 so that there is a rounding 45 in each sectional plane which includes the rotational axis 28.

Figure 4:
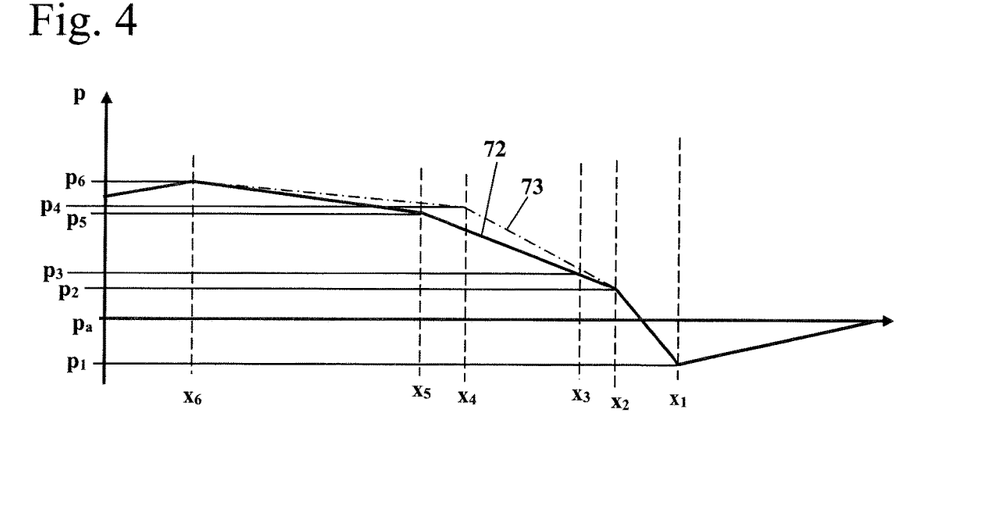
FIG. 4 shows a schematic view of the pressure characteristic curve in the region of the blower of the blowing apparatus during operation.

FIG. 4 shows the pressure characteristic curve in the blower tube 13 during operation of the blowing apparatus 1 at the points $x_1$ to $x_6$. The featured pressure characteristic curve is set in this case at each rotational speed on a similar course, only the absolute pressure alters in dependence upon the rotational speed. The continuous line 72 shows the pressure in the annular space 27 and the depicted dash-dot line 73 shows the pressure in the motor compartment 26. The points $x_1$ to $x_6$ in this case are also shown schematically in FIG. 3. As FIGS. 3 and 4 show, the lowest pressure $p_1$ prevails at a first point $x_1$ directly upstream of the impeller 12. The pressure x1 is lower than the ambient pressure $p_a$. The impeller 12 increases the pressure of the working air flow. Directly downstream of the impeller 12, in the region of the outflow opening 23, a pressure $p_2$, which lies above the ambient pressure $p_a$, prevails at a second point $x_2$. Directly upstream of the diffuser 11, the pressure has been increased further, as seen in the flow direction 22.

At a third point $x_3$ directly upstream of the diffuser 11, a pressure $p_3$, which is higher than the pressure $p_2$, prevails during operation. The pressure in the annular space 27 increases further in the region of the diffuser 11 up to a fifth pressure $p_5$ which is measured at a fifth point $x_5$ directly downstream of the diffuser 11. The pressure also increases further in the flow direction 22 on the outer circumference of the outlet guide element 14, but the pressure increase is smaller than in the region of the diffuser 11. At a sixth point $x_6$ at the extraction opening 18, a sixth pressure $p_6$ prevails. Downstream of the outlet guide element 14, the pressure then reduces again. In the motor compartment 26, a fourth pressure $p_4$ prevails at a fourth point $x_4$ directly downstream of the drive motor 10 with regard to the flow direction 22 in the annular space 27 and in the embodiment is slightly higher than the fifth pressure $p_5$ at the fifth point $x_5$. The fourth pressure $p_4$, however, can also be lower than the fifth pressure $p_5$.

Due to the fact that the sixth pressure $p_6$ at the extraction opening 18 is greater than the second pressure $p_2$ at the outflow opening 23, the cooling air flow flows through the motor compartment 26 in a flow direction 74 which is opposite to the flow direction 22 of the working air flow. The cooling air flow can in this case be effected solely on account of the pressure drop between the outflow opening 23 and the extraction opening 18. The motor compartment 26 in this case is for the most part sealed in relation to the annular space 27 and in relation to the environment. The flow cross section of the cable conduit 17 is advantageously selected to be as small as possible in order to ensure that at most very small quantities of air can flow out through the cable conduit 17. Also, the fourth pressure $p_4$ in the motor compartment 26 downstream of the drive motor 10 with regard to the flow direction 22 is greater than the second pressure $p_2$ at the outflow opening 23 so that regardless of an insignificant air flow through the cable conduit 17 a cooling air flow at the drive motor 10 in the flow direction 74 is ensured.

Figure 5:
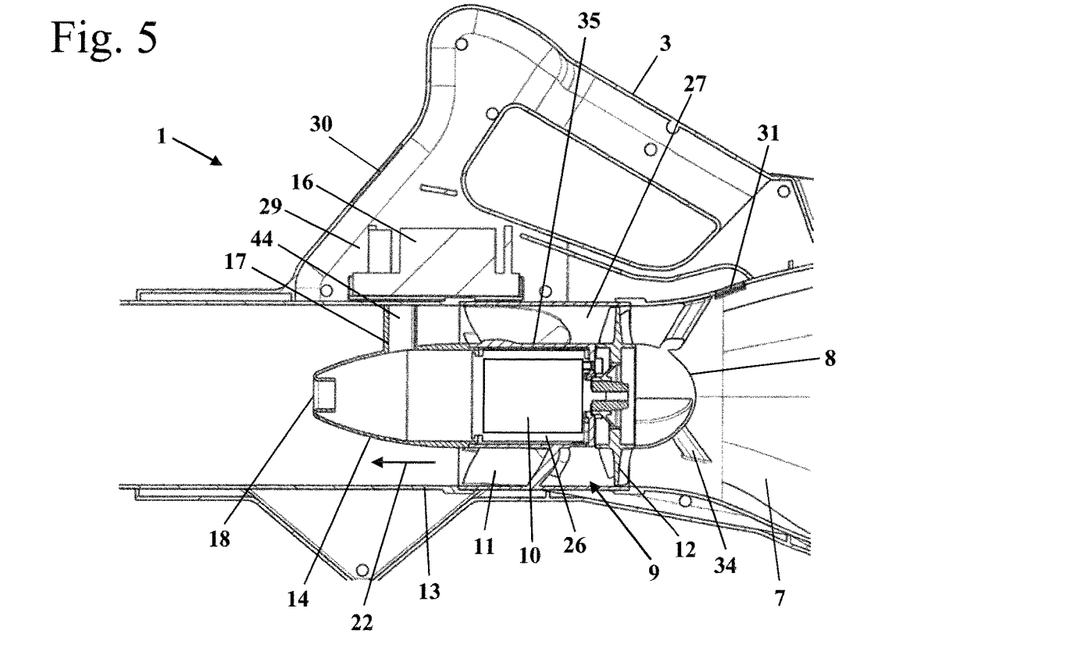
FIG. 5 shows a detailed sectional view of an embodiment of the blowing apparatus from FIG. 1.

FIG. 5 shows an embodiment of the blowing apparatus 1, in which the housing interior 29, in which is arranged the control unit 16 for the drive motor 10, is connected via a first cooling air opening 30 to the environment and via a second cooling air opening 31 to the interior of the blower tube 13 upstream of the impeller 12. Due to the fact that the first pressure $p_1$ in the blower tube 13 upstream of the impeller 12 is considerably lower than the ambient pressure $p_a$ (see FIG. 4), air is also drawn through the housing interior 29 into the blower tube 13 via the cooling air openings 30 and 31. The control unit 16 is arranged in the cooling air flow from the first cooling air opening 30 to the second cooling air opening 31 and is actively cooled as a result. The construction of the blowing apparatus 1 shown in detail in FIG. 5 corresponds in other respects to the construction which is shown and described in the preceding figures, wherein the same designations refer to mutually corresponding elements.

Figure 6:
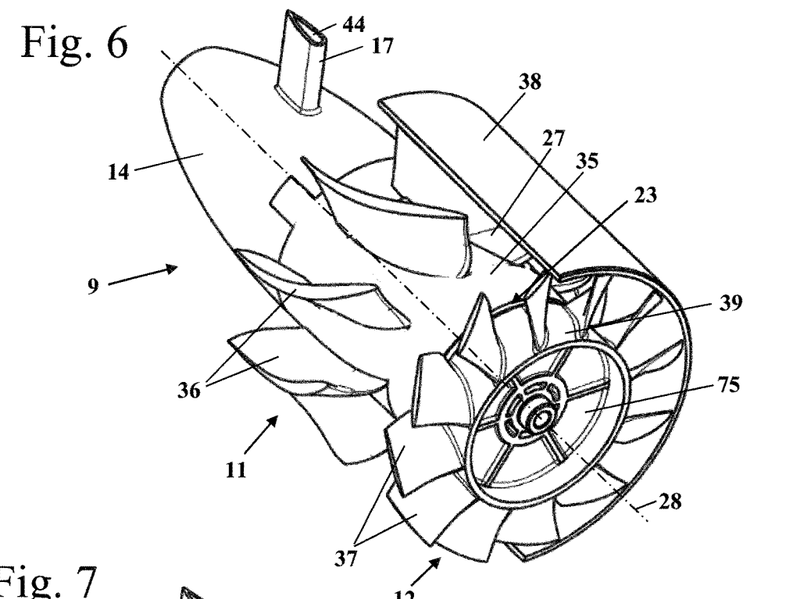
FIG. 6 shows a partially sectioned, perspective view of the blower of the blowing apparatus from FIG. 1.
Figure 7:
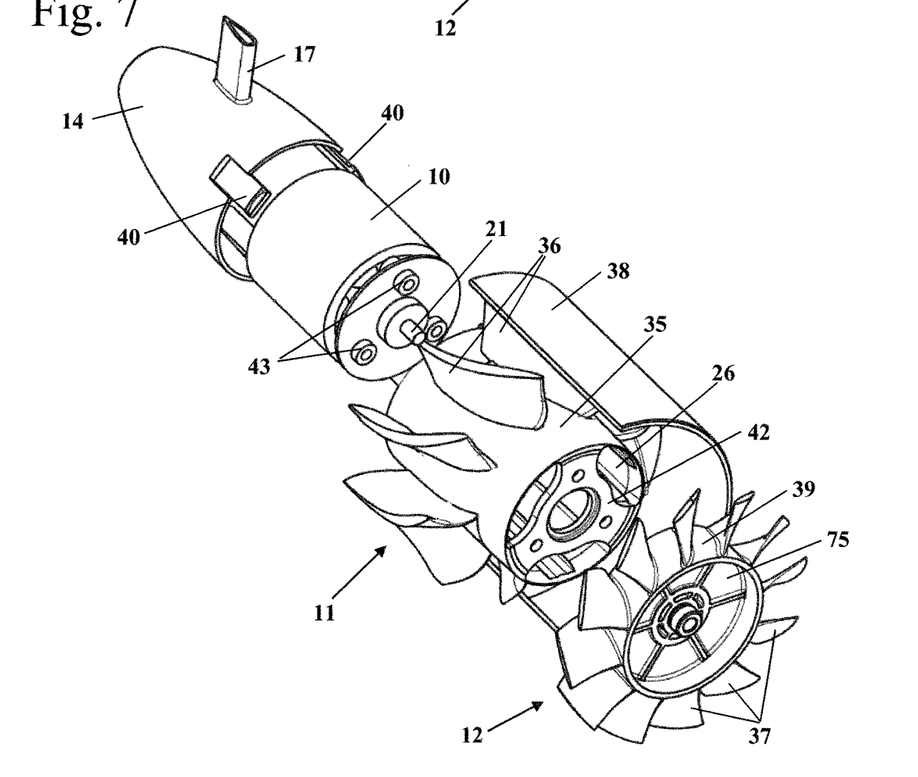
FIG. 7 shows an exploded view of the blower from FIG. 6.

FIG. 6 and FIG. 7 show the configuration of the blower 9 in detail. As FIG. 6 shows, a feed-through opening 44 leads through the cable conduit 17 and connecting cables, not shown in FIGS. 6 and 7, are guided through this opening. The diffuser 11 has an outer wall 38 which is of cylindrical configuration and is arranged concentrically to the inner wall 35 and to the rotational axis 28. The diffuser 11 has multiplicity of guide vanes 36 which fixedly connect the inner wall 35 to the outer wall 38 and are arranged in the annular space 27. The outer wall 38 forms a part of the blower tube 13. The impeller 12 has a multiplicity of vanes 37 which are fixed on the inner wall 39. Between the inner walls 35 and 39, the outflow opening 23 is formed as an encompassing slot. Since no air has to flow through the inner wall 39 of the impeller 12, the inner wall 39 can be closed off via a transverse wall 75 which in the embodiment extends perpendicularly to the rotational axis 28.

As FIG. 7 shows, the outlet guide element 14 is provided with locking fingers 40 which engage on the inner wall 35 of the diffuser 11 and fixedly connect the outlet guide element 14 to the diffuser 11. The inner wall 35 delimits the motor compartment 26 in which is arranged the drive motor 10. The drive motor 10 in the embodiment is fixed via altogether three fastening screws 43 to a fastening flange 42 which is fixedly connected to the diffuser 11. The fastening flange 42 can advantageously be formed in one piece with the diffuser 11.

Figure 8:
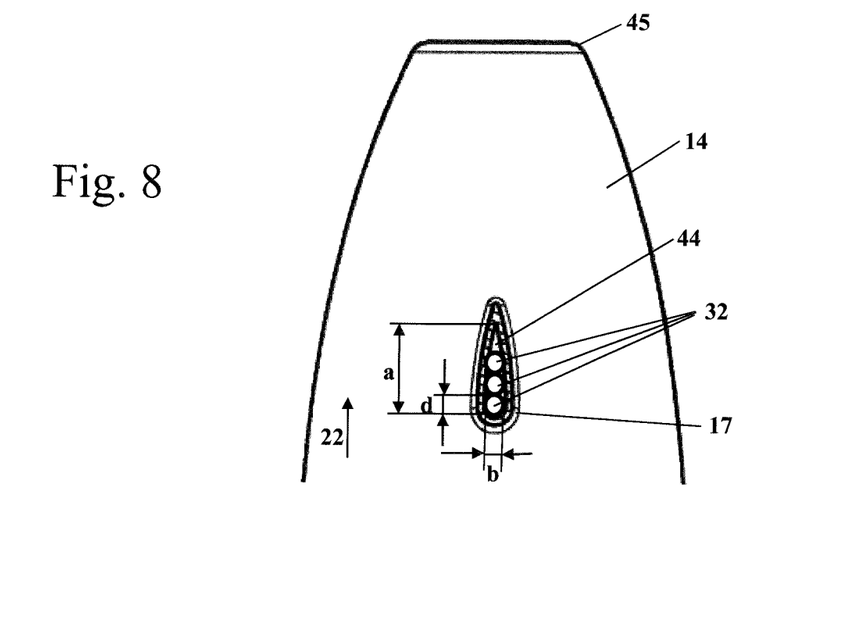
FIG. 8 shows a section through the cable conduit of the blower from FIG. 6.

FIG. 8 shows the configuration of the lead-through opening 44 in detail. In the embodiment, provision is made for three connecting cables 32 for the drive motor 10 which connect the drive motor 10 to the control unit 16 and/or to the battery 24. The connecting cables 32 in the embodiment have a diameter (d) which corresponds approximately to the width (b) of the lead-through opening 44. The cable conduit 17 is of streamlined configuration and has an airfoil-like cross section. The three connecting cables 32 are arranged in series in the flow direction 22. The lead-through opening 44 has a length (a) which in the embodiment corresponds approximately to four times the diameter (d) of a connecting cable 32. The free flow cross section of the lead-through opening 44 which remains between the connecting cables 32 and the wall of the cable conduit 17 is very small. The free flow cross section is advantageously less than approximately 10%, especially less than approximately 5%, of the flow cross section of the extraction opening 18 (FIG. 3). The cable conduit 17 is particularly advantageously for the most part sealed, advantageously totally sealed.

Figure 9:
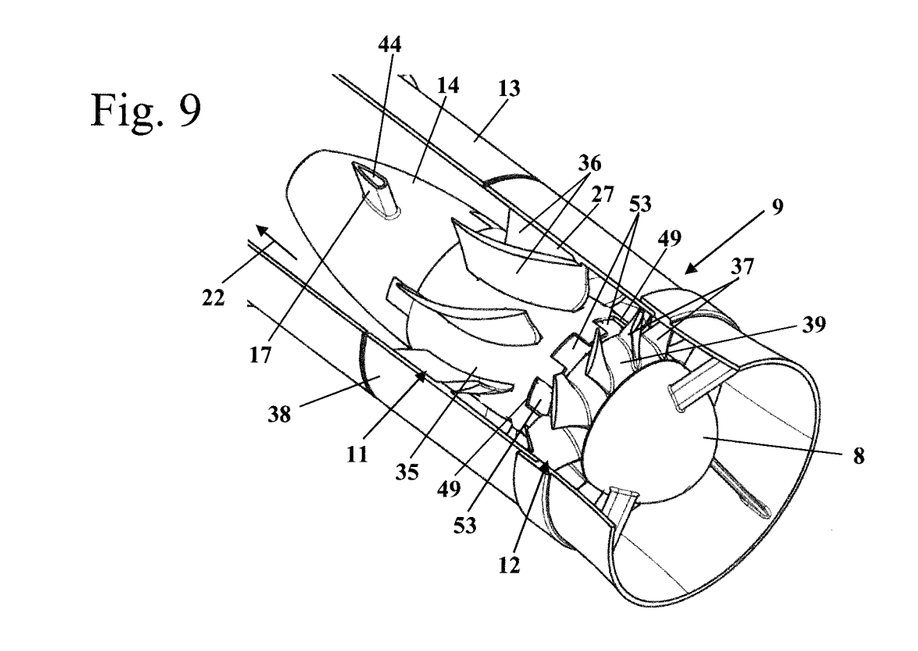
FIG. 9 shows a partially sectioned, perspective view of an embodiment of the blower.

FIG. 9 shows a further embodiment of a blower 9. In the case of the blower 9 shown in FIG. 9, a plurality of cutouts 49 are formed on the diffuser 11 on the side facing the impeller 12 and delimit the outflow openings 53 for the cooling air of the drive motor 10. The outflow openings 53 in this case lead in the flow direction 22 between the impeller 12 and the guide vanes 36 of the diffuser 11 into the annular space 27. The further construction of the blower 9 corresponds to the blower 9 shown in FIG. 6. The same designations identify mutually corresponding components in this case.

Figure 10:
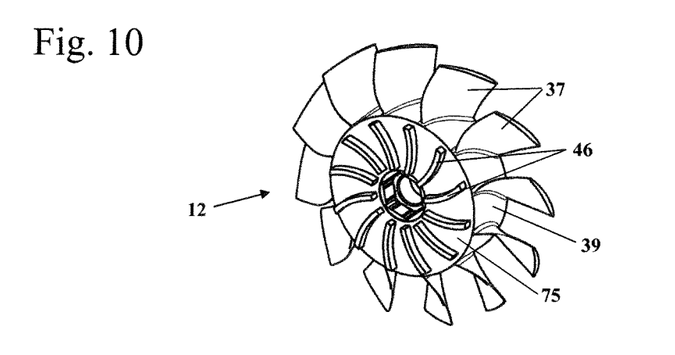
FIG. 10 shows a perspective view of an embodiment of an impeller.

FIG. 10 shows an embodiment variant of an impeller 12, in which additional fan vanes 46 are arranged on the downstream-disposed side of the intermediate wall 75 in the flow direction 22. The additional fan vanes 46 form a radial blower which boosts the cooling air flow through the motor compartment 26. Additional fan vanes 46 can be especially advantageous if the outflow opening (23, 53) is provided between the impeller 12 and the diffuser 11 in the flow direction 22.

Figures 11, 12:
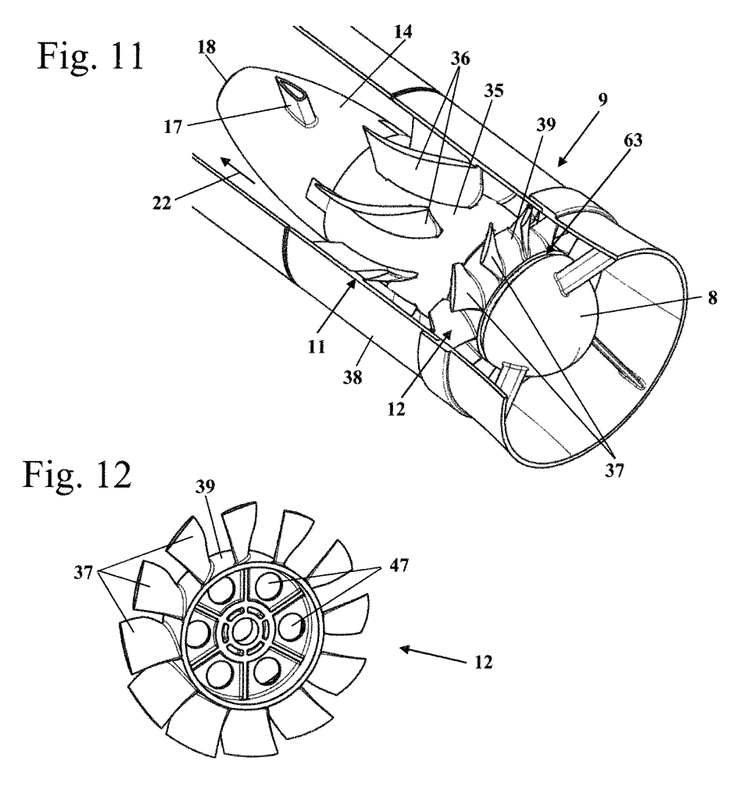
FIG. 11 shows a perspective, partially sectioned view of an embodiment of the blower.
FIG. 12 and FIG. 13 show perspective views of embodiments of the impeller of the blower from FIG. 11.

In the case of the embodiment of a blower 9 shown in FIG. 11, an outflow opening 63 is arranged between the inlet guide element 8 and the impeller 12 with regard to the flow direction 22, that is, upstream of the impeller 12. In other respects, the configuration of the blower 9 generally corresponds to the configurations which are described in relation to the preceding figures. Shown perspectively in FIG. 12 is the impeller 12 of the blower from FIG. 11. The impeller 12 has a multiplicity of passages 47 which are arranged inside the inner wall 39 and through which the cooling air can flow from the motor compartment 26 inside the inner wall 39 onto the upstream-disposed side of the impeller 12. In order to ensure that the air discharges through the outflow opening 63, a seal is advantageously provided between the inner walls 35 and 39 of diffuser 11 and impeller 12. Consequently, an increased constructional cost results. The pressure drop which is provided between the extraction opening 18 and the outflow opening 63 and which can be utilized for the air flow, is considerably greater, however, as FIG. 4 shows, so that a larger cooling air flow is created.

Figure 13:
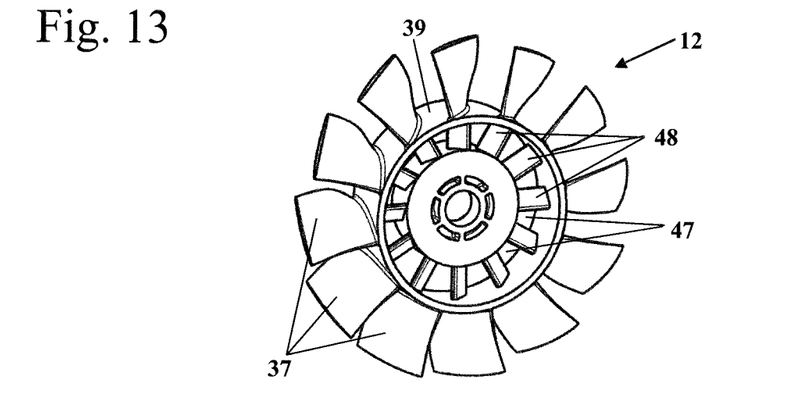

FIG. 13 shows an embodiment for an impeller 12 for the blower 9 shown in FIG. 11. The passage 47 has a multiplicity of additional fan vanes 48 arranged inside the inner wall 39 which form an axial blower and which additionally boost the feed of cooling air.

Figure 14:
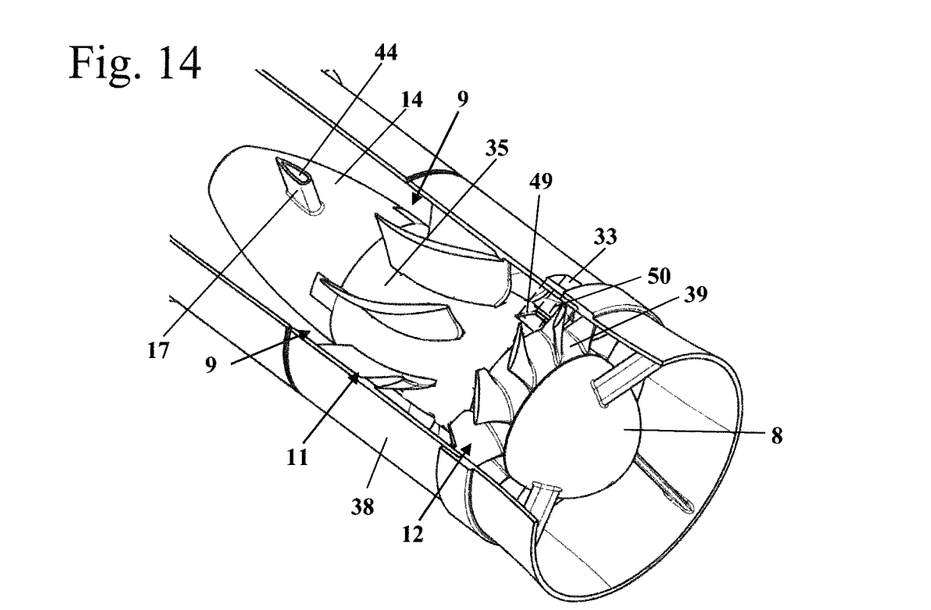
FIG. 14 shows a perspective, partially sectioned view of a further embodiment of the blower.

FIG. 14 shows an embodiment of a blower 9 in which a cutout 49 on the diffuser 11 is connected to an outflow opening 33, which opens outside the blower tube 13, via a schematically depicted passage 50. The outflow opening 33 can open into the housing interior 29, for example. The outflow opening 33, however, can also open into the environment outside the housing interior 29.

Figure 15:
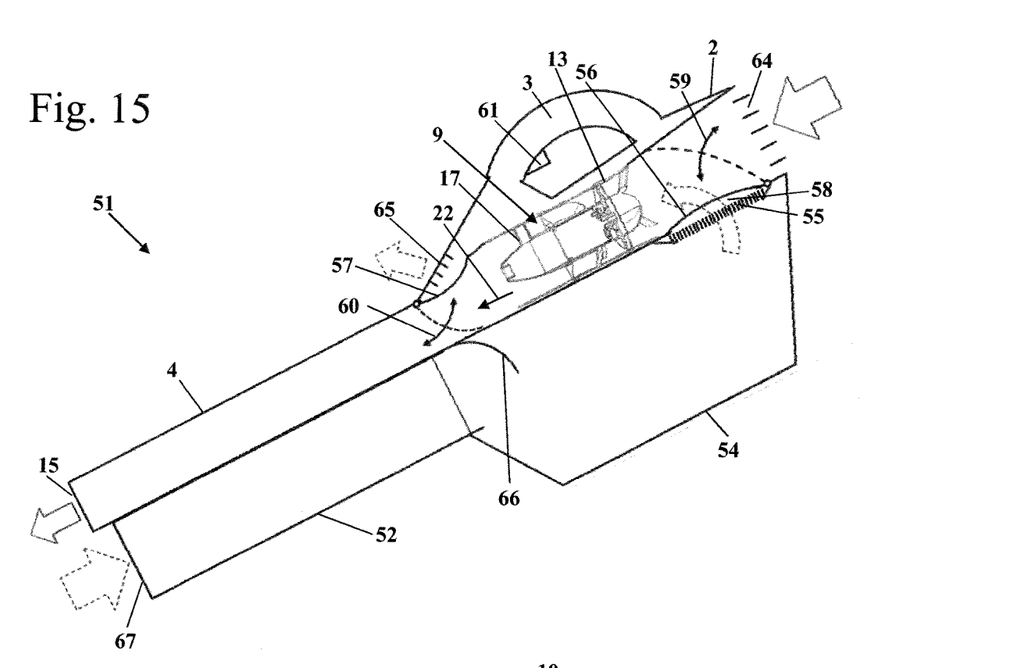
FIG. 15 and FIG. 16 show schematic views of vacuum/blowing apparatuses.

As an embodiment for a handheld work apparatus with a blower tube 13, FIG. 15 shows a vacuum/blowing apparatus 51 which has a blower 9. The vacuum/blowing apparatus 51 has a suction tube 52, on the end face of which is formed a suction opening 67 through which a suction air flow is drawn. The suction tube 52 opens into a collecting receptacle 54. In the embodiment, a guide element 66 is arranged at the mouth opening of the suction tube 52 in the collecting receptacle 54. The collecting receptacle 54 is connected to a blower tube 13 via an opening 58. The opening 58 in this case opens into the blower tube 13 upstream of a blower 9. The blower 9 corresponds to a blower 9 which is described in relation to the preceding figures. Downstream of the blower tube 13, provision is made for a discharge nozzle 4 through which the working air flow can leave the vacuum/blowing apparatus 51 through a discharge opening 15.

The vacuum/blowing apparatus 51 shown in FIG. 15 can be used as a vacuum apparatus or as a blowing apparatus. For switching between these operating states, two flap valves 56 and 57 are provided. FIG. 15 shows, via a continuous line, the position of the flap valves 56 and 57 in blowing mode. Upstream of the blower 9, provision is made for a secondary suction opening 64 via which the blower tube 13 in the depicted position of the first flap valve 56 is connected to the environment. The blower 9 delivers the working air flow, which is drawn in from the environment, through the discharge nozzle 4 which in the depicted position of the second flap valve 57 is connected to the blower 9. For switching into the suction mode, the flap valves 56 and 57 are pivoted into the positions indicated by dashed lines, specifically along the double arrows 59 and 60. As a result, the blower 9, with regard to the flow direction 22 through the blower 9, is connected upstream to the collecting receptacle 54 and to the suction tube 52 which is arranged thereupon. The blower 9 draws in the working air flow through the suction tube 52 and the collecting receptacle 54. From the collecting receptacle 54, the air enters the blower tube 13 through the opening 58 via a filter 55. Via the filter 55, drawn-in material, such as leaves or the like, in the collecting receptacle 54 are separated out. The discharge nozzle 4 is closed off via the flap valve 57. The suction air flow which is delivered by the blower 9 leaves the housing 2 of the vacuum/blowing apparatus 51 through a secondary discharge opening 65 which is opened by the flap valve 57. As a result, no blowing air flow is delivered through the discharge nozzle 4.

Figure 16:
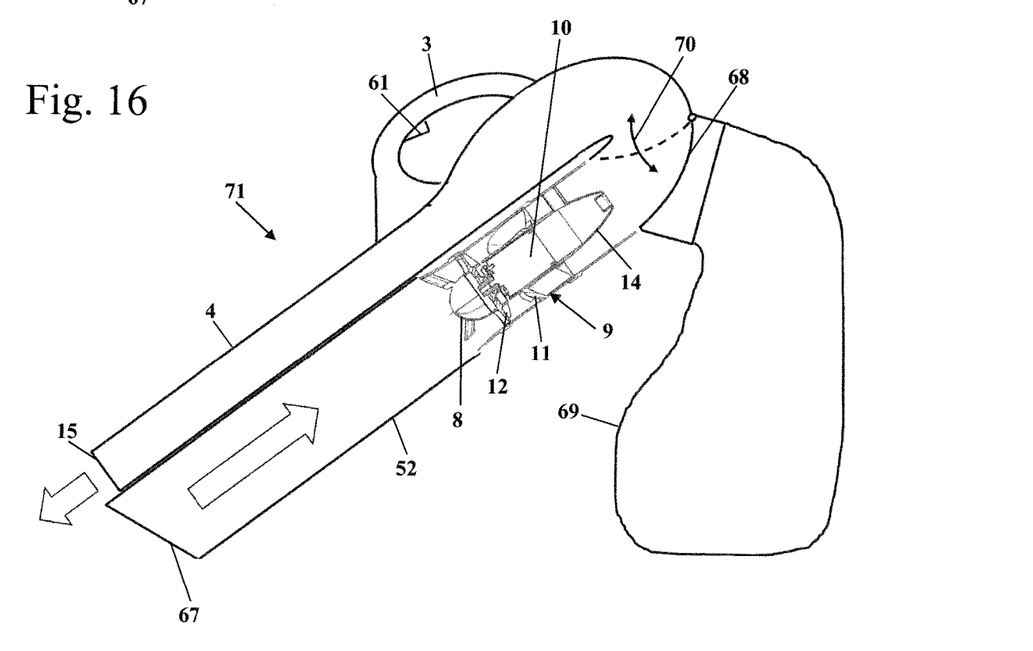

FIG. 16 shows a further embodiment of a vacuum/blowing apparatus 71. In the case of the vacuum/blowing apparatus 51 shown in FIG. 16, only a single flap valve 68 is provided for switching between suction mode and blowing mode. The blower 9 is arranged in the suction tube 52. As a result, drawn-in suction material, such as leaves or the like, bypass the blower 9. Owing to the fact that the motor compartment 26 is largely of a closed design, the drive motor 10 is still protected against contamination and damage. The flap valve 68 can be pivoted in the direction of the arrow 70. In the position of the flap valve 68 shown in FIG. 16 by a continuous line, the vacuum/blowing apparatus 71 is in blowing mode. The blower 9 draws in working air through the suction opening 67 and the suction tube 52 and the air is deflected downstream of the blower 9 by approximately 180° and delivered through the discharge nozzle 4. The working air flow leaves the vacuum/blowing apparatus 71 at the discharge opening 15. In suction mode, the flap valve 68 closes off the discharge nozzle 4. The working air flow is drawn in through the suction tube 52 and, bypassing the blower 9, is delivered into a collecting bag 69 which is opened by the flap valve 68. The collecting bag 69 is air-permeable so that contaminants which are drawn in are retained in the collecting bag 69 and the delivered working air flow leaves the collecting bag 69 through the material of the collecting bag 69 into the environment. The vacuum/blowing apparatuses 51 and 71 shown in FIGS. 15 and 16 have in each case an operating lever 61 for actuating the drive motor 10. A corresponding operating lever is also provided in the case of the blowing apparatus 1, but not shown in the figures.

In all the embodiments, the fifth pressure $p_5$ at the extraction opening 18 is greater than the pressure $p_2$ or $p_a$ at the outflow opening (23, 33, 53, 63). The delivery of cooling air flow for the drive motor 10 is consequently carried out on account of the pressure drop. The delivery of cooling air flow can be boosted by an additional blower. Also, the fourth pressure $p_4$ in the motor compartment is greater than the second pressure $p_2$ at the outflow opening. The pressure at the outflow opening (23, 33, 53, 63) is in this case at most as high as the third pressure $p_3$ in the annular space 27 directly upstream of the diffuser 11. In all the figures, the same designations refer to mutually corresponding elements.

Figure 17:
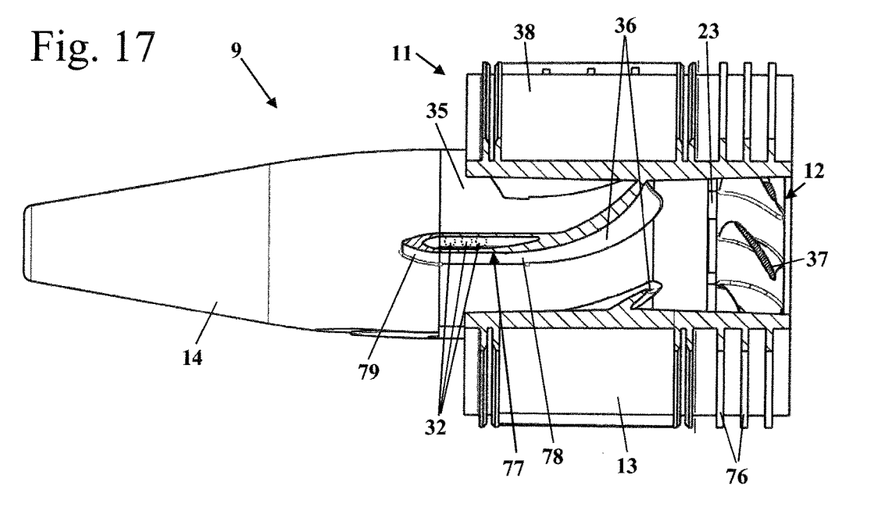
FIG. 17 shows a sectional view of an embodiment of a blower.
Figure 18:
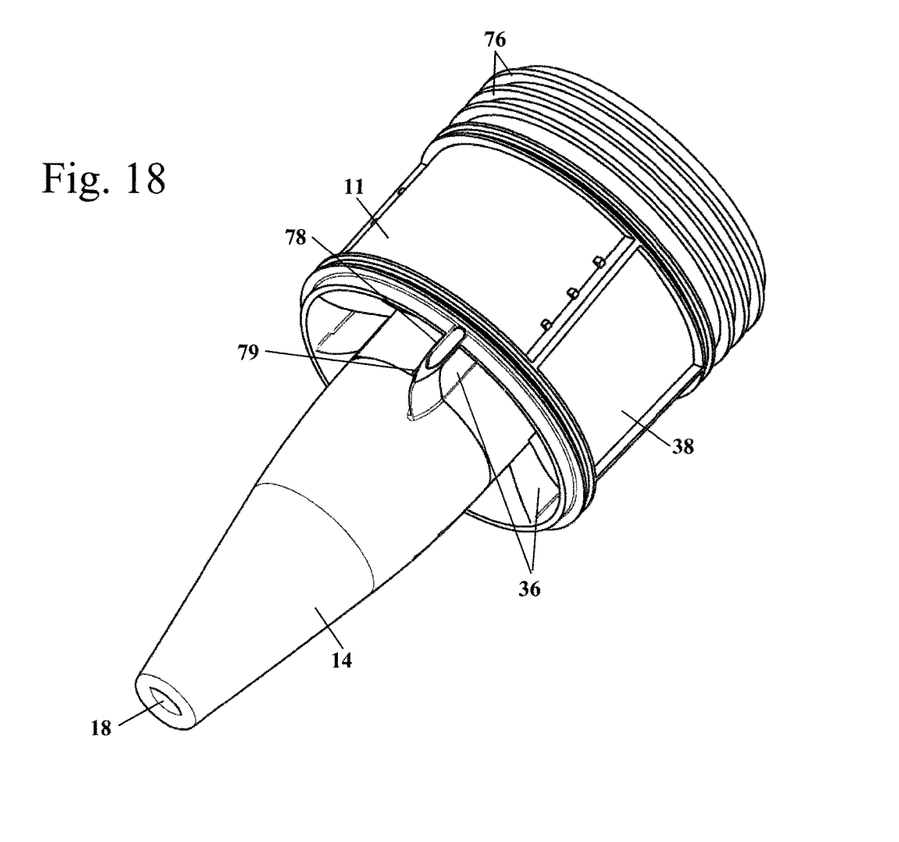
FIG. 18 shows a perspective view of the blower from FIG. 17.

Shown in FIGS. 17 and 18 is a further embodiment for a blower 9. The blower 9 has a diffuser 11, the outer wall 38 of which forms a section of the blower tube 13. The diffuser 11 has a multiplicity of guide vanes 36. The inner wall 35 of the diffuser 11 terminates inside the outer wall 38. Arranged in this region, upstream of the inner wall 35, is an impeller 12 which has vanes 37. An outflow opening 23 for cooling air is formed between the impeller 12 and the inner wall 35 of the diffuser 11. The cooling air flows into the outlet guide element 14 at an extraction opening 18. As FIGS. 17 and 18 show, a cable conduit 77 for connecting cables 32 of the drive motor 10 is formed on one of the guide vanes 36. The connecting cables 32 are inscribed schematically in FIG. 17. A different number of connecting cables 32 can also be practical. The guide vane 36, within which the cable conduit 77 is formed, has a first shell section 78 which is formed on the diffuser 11. A second shell section 79 is formed on the outlet guide element 14. The parting plane between the two shell sections 78 and 79 extends through the cable conduit 77 so that the connecting cables 32 can be laid in the shell section 78 during assembly and the outlet guide element 14 can then be installed on the diffuser 11 so that the cable conduit 77 is closed off. It can also be provided to configure the first shell section 78 or the second shell section 79 as a separate component or to form them on another component.

In the embodiment shown in FIGS. 17 and 18, ribs 76 are formed on the outer side of the outer wall 38, increasing the rigidity of the outer wall 38. The blower 9 is mounted in the housing 2 of the blowing apparatus 1 in the region of the guide vanes 36. In the region of the guide vanes 36, the blower 9 has high stability and robustness. Loads and impacts from outside which deform the outer wall of the diffuser 11 in such a way that the outer wall of the diffuser 11 comes into contact with the impeller 12, can largely be avoided.

Figure 19:
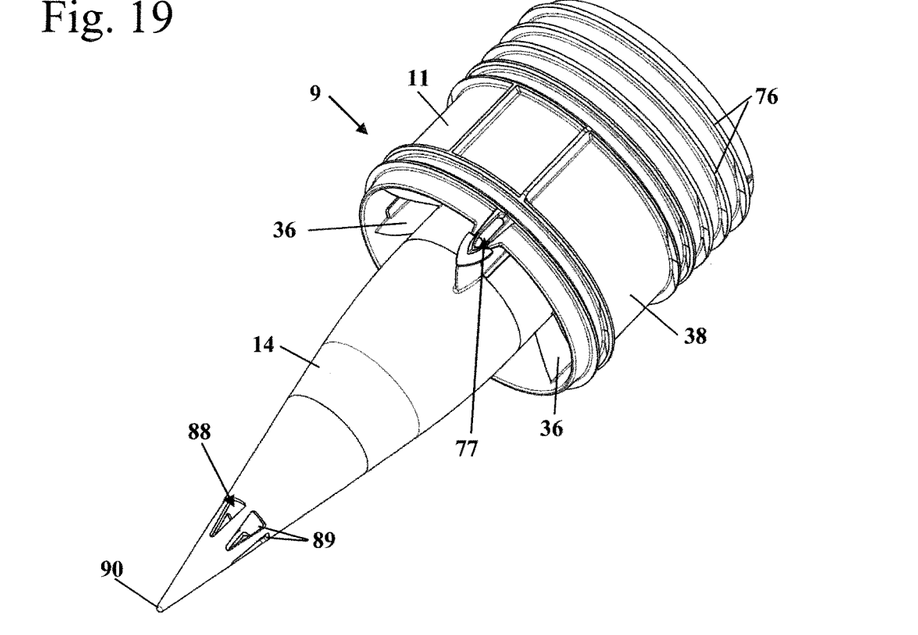
FIG. 19 and FIG. 20 show perspective views of embodiments of blowers.
Figure 20:
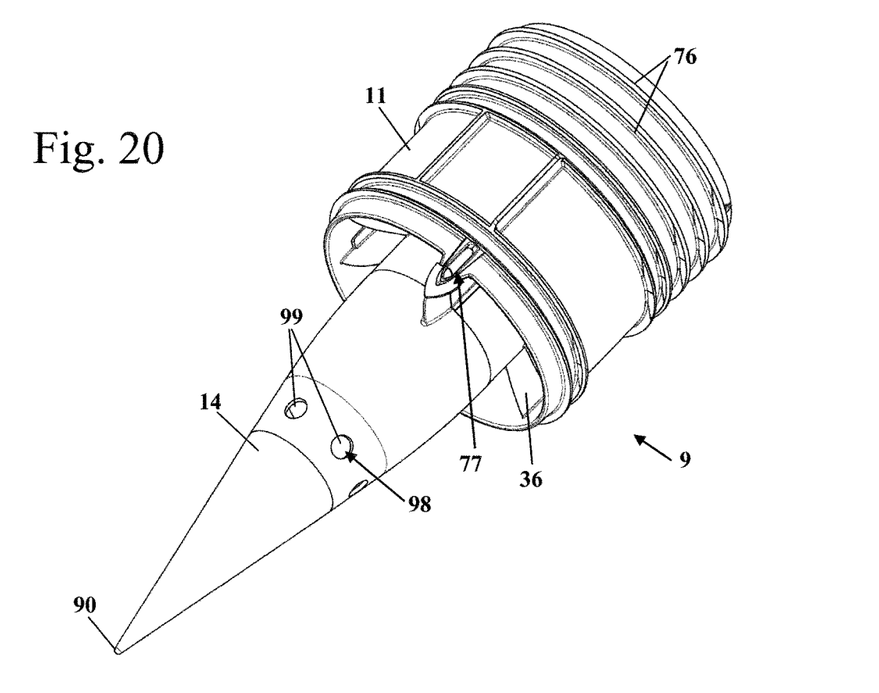

FIGS. 19 and 20 show further embodiments for blowers 9. In the case of the embodiment shown in FIG. 19, the outlet guide element 14 has an extraction opening 88 which is not arranged on the end face of the outlet guide element 14 but on its circumference adjacent to the downstream-disposed end of the outlet guide element 14. The downstream-disposed end of the outlet guide element 14 tapers to a point 90 in the embodiment. Another configuration of the downstream-disposed end of the outlet guide element 14 can also be advantageous, however. The extraction opening 88 is formed by a plurality of penetrations 89 in the wall of the outlet guide element 14 which connect the interior of the outlet guide element 14 with its outer side. In the embodiment, the penetrations 89 are distributed uniformly over the circumference and have an approximate triangular shape.

In the case of the embodiment of a blower 9 shown in FIG. 20, provision is made on the outlet guide element 14 for an extraction opening 98 which is formed by a plurality of circular penetrations 99. The penetrations 99 are arranged approximately centrally between the downstream-disposed end of the guide vanes 36 and the point 90 and at the same time are arranged in a distributed manner over the circumference of the outlet guide element 14. A different arrangement or number of penetrations (89, 99) can also be advantageous.

The further configuration of the blower 9 from FIGS. 19 and 20 generally correspond to the configuration of the embodiment shown in FIGS. 17 and 18, wherein the same designations refer to mutually corresponding elements.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
an electric drive motor;
a blower tube;
a blower arranged in said blower tube and configured to convey a working air flow through said blower tube in a flow direction;
said blower including at least one impeller configured to be rotatably driven about a rotational axis by said drive motor and at least one diffuser fixedly held at a location in said blower tube;
said diffuser being arranged downstream of said impeller with respect to said flow direction;
said blower tube further having a motor compartment arranged therein;
said electric drive motor being arranged in said motor compartment;
said blower tube and said motor compartment conjointly defining an annular space therebetween configured to permit said working air flow to flow therethrough;
the work apparatus defining an extraction opening for cooling air for said electric drive motor;
said extraction opening being arranged downstream of said diffuser;
said motor compartment having at least one outflow opening for cooling air arranged upstream of said extraction opening with respect to said flow direction in said blower tube;
said annular space being connected to said motor compartment via said extraction opening;
said extraction opening and said outflow opening being arranged such that during operation of said work apparatus a first pressure ($p_5$) at said extraction opening is greater than a second pressure ($p_2$, $p_a$) at said outflow opening.

2. The work apparatus of claim 1, wherein, during operation of the work apparatus, a third pressure ($p_4$) in said motor compartment downstream of said drive motor with respect to the flow direction of said working air flow through said blower tube is greater than said second pressure ($p_2$, $p_a$) so that said cooling air in said motor compartment flows on said electric drive motor in the opposing direction to said working air flow.

3. The work apparatus of claim 1, wherein said motor compartment is a substantially closed space with exception of said extraction opening and said outflow opening.

4. The work apparatus of claim 1, wherein:
said outflow opening opens into a region at which said second pressure ($p_2$, $p_a$) is present during operation of the work apparatus;
said annular space having, directly upstream of said diffuser with respect to said flow direction, a fourth pressure ($p_3$); and,
said second pressure ($p_2$, $p_a$) being at most as great as said fourth pressure ($p_3$).

5. The work apparatus of claim 4, wherein said outflow opening opens into said annular space upstream of said diffuser with respect to said flow direction.

6. The work apparatus of claim 5, wherein said outflow opening is formed by a gap between said diffuser and said impeller.

7. The work apparatus of claim 4, wherein said outflow opening opens to the ambient.

8. The work apparatus of claim 1 further comprising:
an outlet guide element arranged upstream of said blower and having an outer diameter which decreases in said flow direction in said annular space.

9. The work apparatus of claim 8, wherein:
said outlet guide element has a first end face disposed downstream with respect to said flow direction in said annular space; and,
said extraction opening is arranged at said first end face of said outlet guide element.

10. The work apparatus of claim 8, wherein:
said impeller defines a rotational axis; and,
said outlet guide element is configured rounded adjacent to said extraction opening in a section plane containing said rotational axis of said impeller.

11. The work apparatus of claim 1, wherein:
said drive motor has an outer periphery; and,
said diffuser has a cylindrical inner wall completely surrounding said outer periphery of said drive motor.

12. The work apparatus of claim 1 further comprising:
a discharge nozzle fixed on said blower tube; and,
said blower being configured to convey said working air flow through said discharge nozzle.

13. The work apparatus of claim 1 further comprising:
said drive motor has a connecting cable;
a housing defining a housing interior space arranged outside said blower tube;
a cable conduit connecting said motor compartment to said housing interior space; and,
said connecting cable being configured to project through said cable conduit.

14. The work apparatus of claim 13, wherein:
said extraction opening has a first flow cross-section; and,
said cable conduit has a free flow cross-section being less than approximately 10% of said first flow cross-section.

15. The work apparatus of claim 13 further comprising a control for said drive motor arranged in said housing interior space.

16. The work apparatus of claim 15, wherein:
said housing has a first cooling air opening leading into said housing interior space;
said housing interior space being connected to a region upstream of said blower via a second cooling air opening; and, said control is arranged, in said flow direction, between said first cooling air opening and said second cooling air opening.

17. The work apparatus of claim 1, wherein said drive motor is an internal rotor motor.

18. The work apparatus of claim 1 further comprising a handle configured to enable a user to guide said working air flow during operation.

19. The work apparatus of claim 1, wherein said work apparatus is a blower or a blower/vacuum apparatus.

* * * * *